United States Patent [19]
Tse et al.

[11] Patent Number: 5,881,995
[45] Date of Patent: Mar. 16, 1999

[54] NOISE ATTENUATING DEVICE FOR BUTTERFLY VALVES

[75] Inventors: Man-Chun Tse, Brossard; Hilaire Bonneau, Boucherville, both of Canada

[73] Assignee: Pratt & Whitney Canada Inc., Longueuil, Canada

[21] Appl. No.: 990,994

[22] Filed: Dec. 15, 1997

[51] Int. Cl.$^6$ ........................................... F16K 1/22
[52] U.S. Cl. ........................................... 251/305; 251/304
[58] Field of Search ..................... 251/304, 305

[56] References Cited

U.S. PATENT DOCUMENTS

| | | |
|---|---|---|
| 965,322 | 7/1910 | Peterson . |
| 1,131,371 | 3/1915 | Hatfield . |
| 1,302,891 | 5/1919 | Balthasar . |
| 2,882,010 | 4/1959 | Bryant . |
| 3,238,955 | 3/1966 | Farriter, Jr. ........................... 251/305 X |
| 3,298,677 | 1/1967 | Anderson . |
| 3,442,489 | 5/1969 | Cary et al. ............................ 251/305 |
| 3,677,297 | 7/1972 | Walton . |
| 3,960,177 | 6/1976 | Baumann . |
| 4,194,722 | 3/1980 | Okerblom . |
| 4,296,915 | 10/1981 | Baumann . |
| 4,367,861 | 1/1983 | Bray et al. . |
| 4,469,305 | 9/1984 | Baumann . |
| 4,479,510 | 10/1984 | Bey . |
| 4,489,917 | 12/1984 | Baumann . |
| 4,688,472 | 8/1987 | Anglis .................................. 251/305 X |
| 4,691,894 | 9/1987 | Pyötsiä et al. . |
| 4,712,768 | 12/1987 | Herr et al. . |
| 4,962,783 | 10/1990 | Ball et al. . |
| 4,964,422 | 10/1990 | Ball et al. . |
| 4,967,778 | 11/1990 | Ball et al. . |
| 4,967,997 | 11/1990 | Hines et al. . |
| 4,969,485 | 11/1990 | Ball et al. . |
| 4,995,414 | 2/1991 | Tervo . |
| 5,000,212 | 3/1991 | Tervo . |
| 5,000,213 | 3/1991 | Tervo et al. . |
| 5,005,804 | 4/1991 | Andersen et al. . |
| 5,067,506 | 11/1991 | Ball et al. . |
| 5,102,097 | 4/1992 | Davis et al. . |
| 5,158,265 | 10/1992 | Miyairi . |
| 5,195,719 | 3/1993 | Ball et al. . |
| 5,277,404 | 1/1994 | Andersson . |
| 5,465,756 | 11/1995 | Royalty et al. ..................... 251/305 X |

FOREIGN PATENT DOCUMENTS 420 756  3/1967  Switzerland .

*Primary Examiner*—John Fox
*Attorney, Agent, or Firm*—Jeffrey W. Astle

[57] ABSTRACT

A noise attenuating device for reducing the noise generated by a gas flow passing through an open butterfly valve having a disc pivotally mounted in a valve housing for rotation about a transversal axis between an open and a closed position thereof. The noise attenuating device comprises a first series of elongated members extending from the upstream side of the disc above the transversal axis and a second series of generally diametrically opposed elongated members extending from the downstream side of the disc below the horizontal axis. Typically, the elongated members extend at 45 degree from the disc of the butterfly valve.

16 Claims, 3 Drawing Sheets

NOISE ATTENUATING DEVICE FOR BUTTERFLY VALVES

BACKGROUND OF THE INVENTION

1. Field of the Invention

The present invention relates to a noise attenuating device and, more particularly, to a device which is adapted to attenuate the noise generated by a flow of gas passing through a butterfly valve when in an open position thereof.

2. Description of the Prior Art

Conventional butterfly valves comprise a disc positioned in a duct for rotation about an axis defined by a shaft in order to control a fluid flow through the duct. Typically, the disc is rotated via a torque applied by an external actuator through the shaft.

In a large number of applications, especially where compressible fluids are employed, the use of such a conventional butterfly valve results in undesired effects such as vibration, wear and noise. For example, high speed gas flow generates aerodynamic throttling noise over a wide range of valve opening. More particularly, such aerodynamic noise increases rapidly towards the fully open position (90°) and reaches a peak near 60° valve opening.

Various solutions have been proposed for reducing the valve noise level, notably the installation of a noise attenuating device, such as a muffler, immediately downstream of the butterfly valve. Such butterfly valve and muffler assemblies are well known and widely used in connection with gas turbine engines. However, it has been observed that the muffler may deteriorate with time. Moreover, the butterfly valve and muffler assembly increases the weight and the cost of the overall gas turbine engine.

Efforts have also been made to suppress the noise at the source as, for instance, in U.S. Pat. No. 3,960,177 which issued to Baumann on Jun. 1, 1976, and which discloses a modified butterfly valve having a disc pivotally mounted in a valve housing defining a circular bore. A row of ribs are formed at the outer rim of the disc for breaking the uniform velocity profile. The ribs are arranged to extend generally parallel to the inner wall of the bore when the disc is in closed position. Moreover, the ribs point in opposite directions below and above the horizontal axis of the disc and they are spaced in order to provide flow passages having a constricted cross-section. Therefore, this provides for small individuals jets discharging into a relatively large downstream area (in comparison to the cross-section of the jet) thereby resulting in low velocity and pressure recoveries which in turn ensure low noise level.

Although the butterfly valve described in the above-mentioned patent is very effective, the ribs create an obstruction to the flow.

SUMMARY OF THE INVENTION

It is therefore an aim of the present invention to provide a butterfly valve which is adapted to generate low noise level.

It is also an aim of the present invention to provide such a butterfly valve which is relatively simple and economical to manufacture.

It is a further aim of the present invention to provide an improved attenuation device for a butterfly valve that is an improvement over the above mentioned prior art.

It is a further aim of the present invention to provide such a butterfly valve which is relatively light.

A construction in accordance with the present invention comprises a butterfly valve having a valve housing defining a flow path, and a closure member pivotally mounted in the valve housing for rotation about an axis between an open position for allowing the passage of a gas flow through the valve housing and a closed position wherein the closure member closes all the gas flow through the valve housing. The axis extends centrally of the closure member and divides the same into first and second sections. The closure member has a pressure side surface adapted to face upstream and a suction side surface adapted to face downstream. Furthermore, the closure member includes a noise attenuating means having a first series of separate elongated members fixedly attached to the pressure side surface and extending from the first section of the pressure side surface and a second series of separate elongated members fixedly attached to the suction side surface and extending from the second section of the suction side surface.

Typically, the first and the second series of elongated members are provided with the same number of elongated members, each elongated member of the second series being generally diametrically opposed to an elongated member of the first series.

In accordance with a general aspect of the present invention, the closure member includes a disc having a center and a diameter, and the elongated members of the first and second series are mounted to the disc at a distance from the center of the disc of about a third of the diameter.

According to a further general aspect of the present invention, the elongated members extend at an acute angle from the closure member. Typically, the acute angle is about 45 degree.

In a more specific construction in accordance with the present invention, the pressure side surface and the suction side surface each defines an area, and the elongated members of the first series are regularly spaced apart on the pressure side surface so as to define a first sector which is in a range of about a quarter to about a half of the area of the pressure side, while the elongated members of the second series are regularly spaced apart on the suction side surface so as to define a second sector which is in a range extending from about a quarter to about a half of the area of the suction side surface.

In a still more specific construction in accordance with the present invention, the ratio of the length to the width of the elongated member is in a range extending from about 1.5 to about 3.0.

BRIEF DESCRIPTION OF THE DRAWINGS

Having thus generally described the nature of the invention, reference will now be made to the accompanying drawings, showing by way of illustration a preferred embodiment thereof and in which.

DESCRIPTION OF THE PREFERRED EMBODIMENTS

Figure 1:
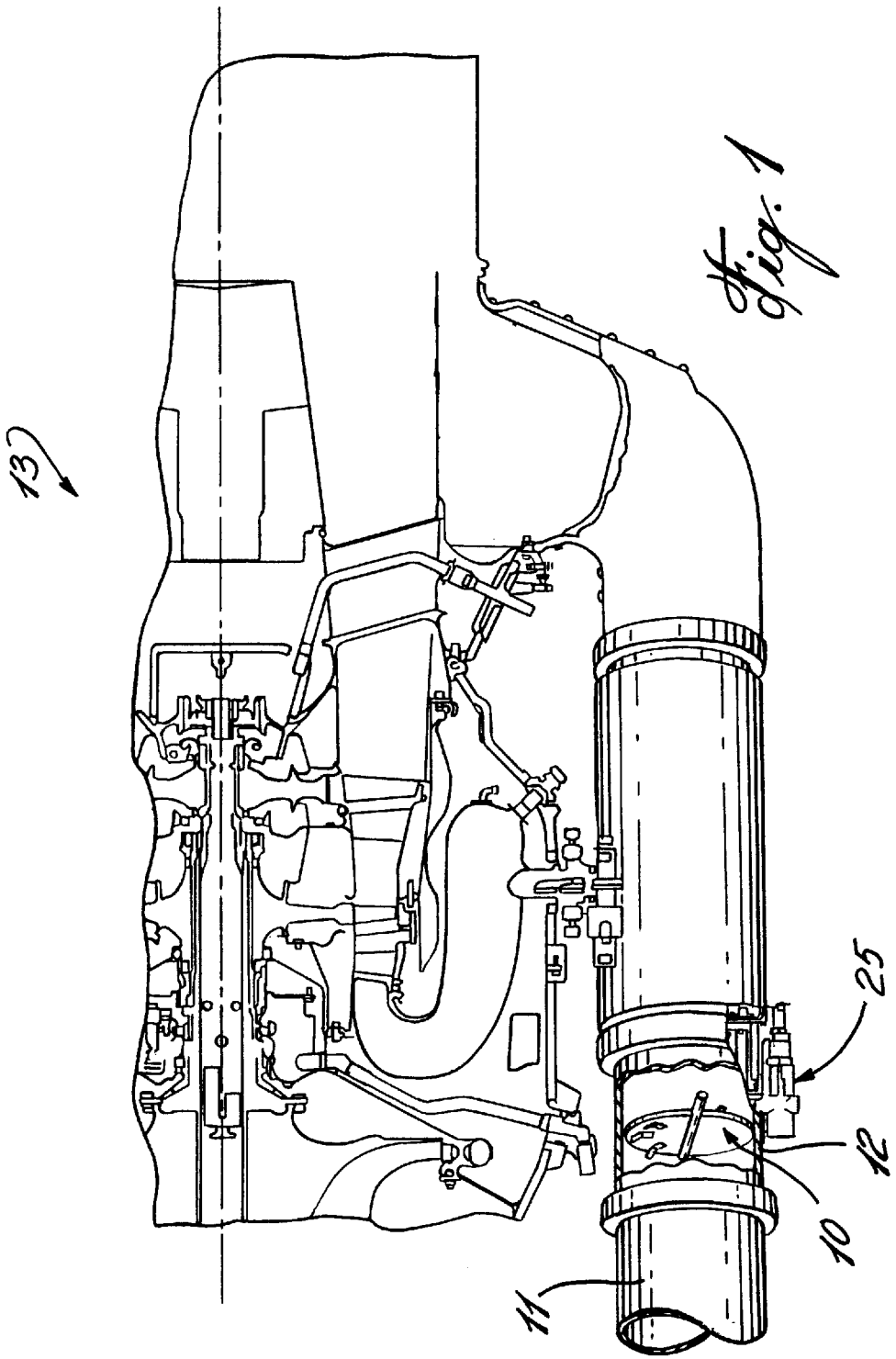
FIG. 1 is a schematic illustration of a gas turbine engine exhaust area showing a butterfly valve installed in an outlet conduit of the gas turbine engine air compressor according to the present invention.

Now referring to the drawings, and in particular to FIGS. 1 to 4, a butterfly valve embodying the elements of the present invention and generally designated by numeral 10 will be described.

As shown in FIG. 1, the butterfly valve 10 may be installed in an exhaust duct 11 of a gas turbine engine 13 for controlling the flow of air emanating from a load compressor of the gas turbine engine 13. The air flow from the load compressor is used to provide air for environmental purposes, such as providing air for an aircraft cabin. When the butterfly valve 10 is closed, air from the load compressor is sent to the cabin area. When no air is required in the cabin area, the butterfly valve 10 is open, thereby enabling the air flow compressed by the load compressor to be expelled out of the engine through the exhaust duct 11. It is understood that the butterfly valve 10 is not restricted to the above described application and that it may be employed in any other applications which necessitate the control of a fluid flow through a duct.

Figure 2:
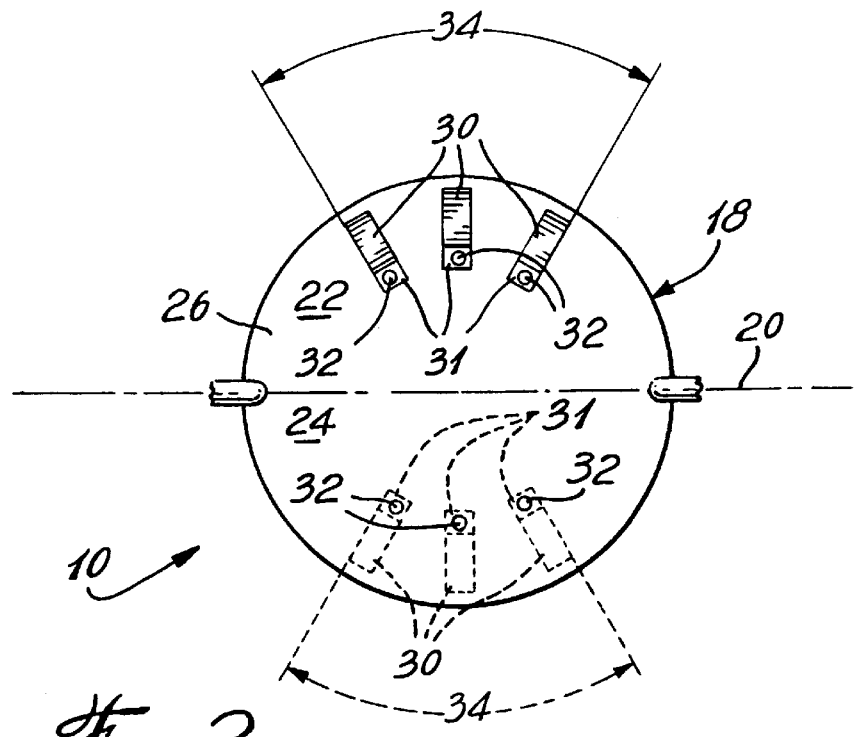
FIG. 2 is a front elevational view of a butterfly valve according to the present invention.
Figure 3:
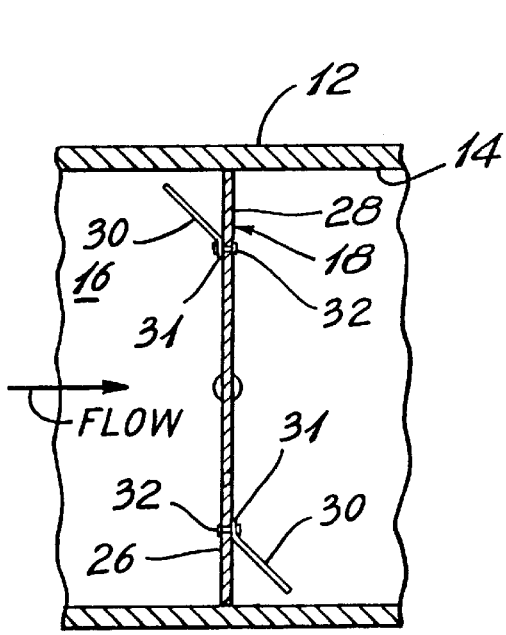
FIG. 3 is a cross-sectional view of the butterfly valve illustrated in a closed position thereof.
Figure 4:
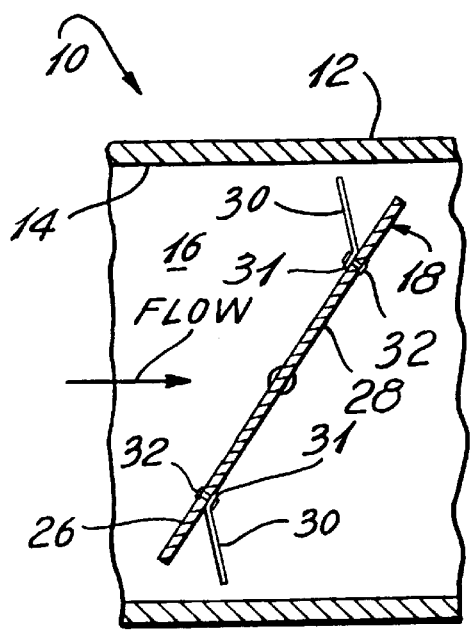
FIG. 4 is a cross-sectional view of the butterfly valve illustrated in a partially open position thereof.

Generally, as illustrated in FIGS. 2 to 4, the butterfly valve 10 comprises a valve housing 12 having an elongated circumferentially extending wall 14 which defines a flow path 16. The valve housing 12 forms part of a duct for conveying a gas flow. A closure member in the form of a flat or convex disc 18 is pivotally mounted in the valve housing 12 for rotation about a transverse axis 20, and is conformed at its outer periphery to the inner surface of wall 14 of the valve housing 12. The closure disc 18 is pivotal between a closed position, as shown in FIG. 3, transverse to the flow path 16 for sealingly engaging the wall 14 of the valve housing 12 to close gas flow therein, and an open position, to allow and control the fluid flow.

Typically, a sealing member (not shown) is provided on the periphery of the disc 18 to cooperate with the wall 14 of the valve housing 12 for sealingly closing gas flow in flow path 16 when the butterfly valve 10 is in its closed position.

Figure 6:
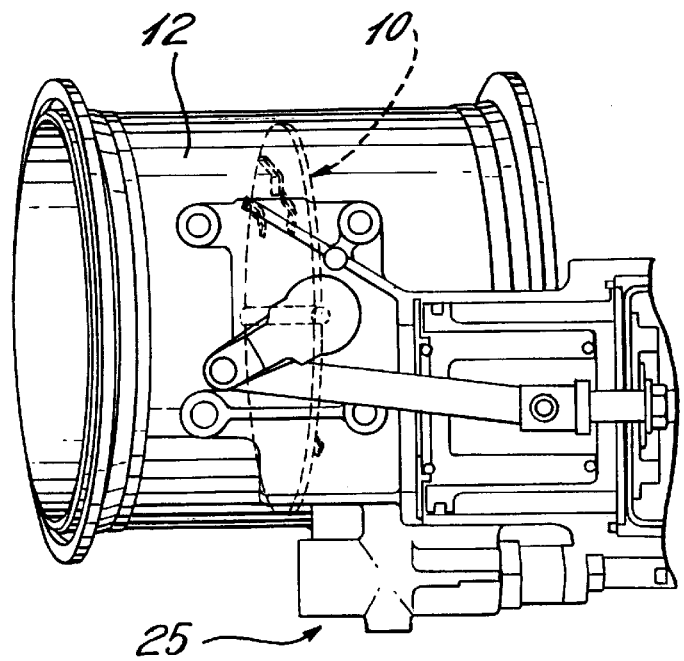
FIG. 6 is a side elevational view of a valve housing having an actuator connected thereto for operating the butterfly valve illustrated in dotted lines.

From FIG. 2, it can be seen that the axis 20 passes through the center of the disc 18 and geometrically divides the same into two symmetrical sections, which are denoted herein as first and second sections 22 and 24, respectively. Accordingly, when an opening torque is applied by an external actuator 25, shown in FIG. 6, to the butterfly valve 10, the disc 18 moves from its zero-angle closed position (FIG. 3) to a partially opened position, as shown in FIG. 4, and the first section 22 is then downstream from the axis 20, whereas the second section 24 is upstream from the axis 20.

The disc 18 has pressure and suction side surfaces 26 and 28 which respectively face the upstream and downstream portions of the butterfly valve 10.

The pressure side surface 26 and the suction side surface 28 are respectively provided with a preferably equal number of generally diametrically opposed elongated members or tabs 30 which are secured at one end 31 thereof to the surfaces 26 and 28 on disc 18 at a radius about a third of the disc diameter by way of rivets 32 or by any suitable means, such as welding. The end portion 31 of each tab 30 is bent in order to provide and angle of about 45 degree between each tab 30 and the surface 26,28 of disc 18. The tabs 30 are preferably uniformly distributed on the first section 22 of the pressure side surface 26 and on the second section 24 of the suction side surface 28 so as to respectively cover a sector 34 of a quarter to a half of the surface of the pressure side and the suction side. The space between the free end of the tabs 30 is approximately equal to the tab width.

According to a preferred embodiment of the present invention, there is provided three tabs 30 on either side of the disc 18. However, the number of tabs 30 required depends on the butterfly valve size and thus some disc 18 may have three or more tabs 30 on either side thereof. The length of the tabs 30 should be projected outward as far as allowed without interfering with the operation of the butterfly valve 10. Finally, the ratio of the length to the width of the tabs 30 should be in a range extending from 1.5 to 3.0.

Figure 5:
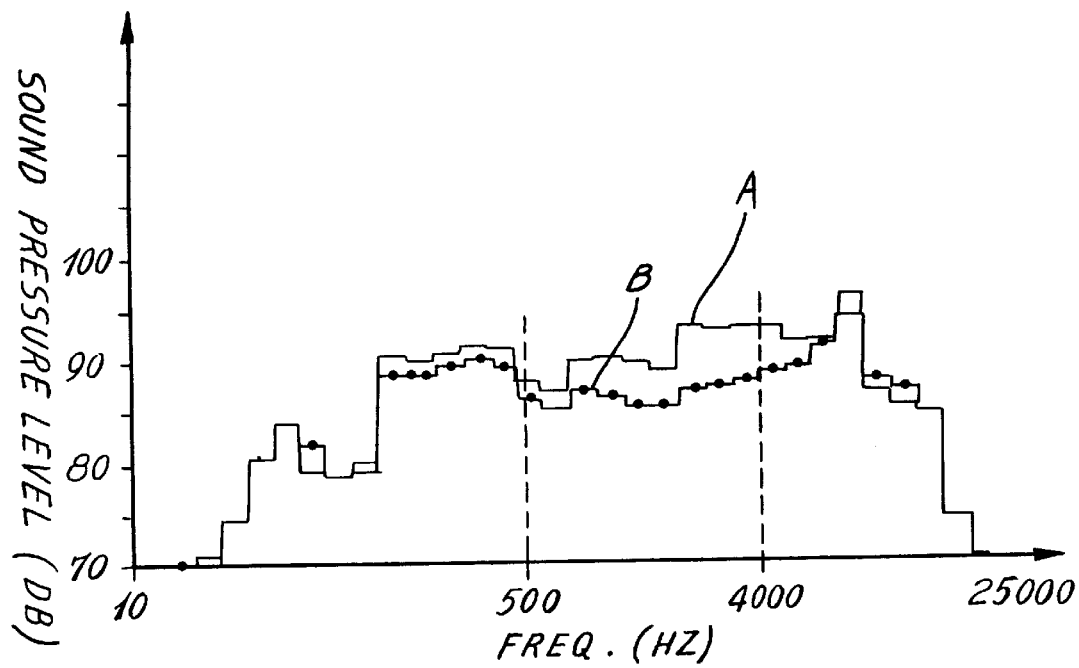
FIG. 5 is a graphic comparison of the noise levels of the butterfly valve embodying the present invention concept compared to that of a muffler installed immediately downstream of a conventional butterfly valve.

In operation, the tabs 30 on the pressure side surface 26 of the butterfly valve 10 generate turbulence which energizes the flow and trap vortexes between the tabs 30 and the valve surface. This helps the on-coming flow passing through the passage formed between the wall 14 of the valve housing 12 and the disc 18 to move more smoothly against the pressure gradient, resulting in smaller gas flow separation downstream of the butterfly valve 10. The tabs 30 on the suction side surface 28 promote turbulence mixing and trap vortices. This helps to reduce the wake region. Therefore, the overall effect of the tabs 30 is to reduce the wake size formed downstream of the butterfly valve 10. This in turn reduces noise at the source, which is obviously the best attenuation method, as indicated in FIG. 5, where curve A represents the sound pressure level of a conventional butterfly valve and muffler assembly used in connection with a gas turbine engine, while curve B shows test results with a specimen of the present invention.

The comparison tests have been performed in the noisiest condition, i.e. at an open angle of 60 degree. The upstream pressure of the exhaust gas was approximately 36 psia. Moreover, the comparison tests reproduce noise spectra at maximum directivity, i.e. 54 degree with respect to the exhaust axis. As tested the butterfly valve 10 includes a closure member 18 having three tabs 30 on either side thereof. It can be observed that the butterfly valve 10 of the present invention provides an extra noise attenuation of approximately 3 to 8 dB over the frequency range of 500 to 4000 Hz.

I claim:

1. In a butterfly valve comprising a valve housing defining a flow path, and a closure member pivotally mounted in said valve housing for rotation about an axis between an open position for allowing the passage of a gas flow through said valve housing and a closed position wherein said closure member closes all the gas flow through said valve housing, said axis extending centrally of said closure member and dividing said closure member into first and second sections, said closure member having a pressure side surface adapted to face upstream and a suction side surface adapted to face downstream, said closure member including a noise attenuating means having a first series of separate elongated members fixedly attached to said pressure side surface and extending from said first section of said pressure side surface and a second series of separate elongated members fixedly attached to said suction side surface and extending from said second section of said suction side surface, whereby the elongated members are effective for attenuating aerodynamic throttling noise without obstructing significantly the flow of gas.

2. A butterfly valve as in claim 1, wherein said first and second series of separate elongated members are provided with the same number of elongated members, and wherein each elongated member of said second series is generally diametrically opposed to an elongated member of said first series.

3. A butterfly valve as in claim 2, wherein each said first and second series of separate elongated members includes at least three elongated members.

4. A butterfly valve as in claim 1, wherein said closure member includes a disc having a center and a diameter, and wherein said elongated members of said first and second series are mounted to said disc at a distance from said center of said disc of about a third of said diameter.

5. A butterfly valve as in claim 1, wherein said elongated members extend at an acute angle from said closure member.

6. A butterfly valve as in claim 5, wherein said acute angle is about 45 degree.

7. A butterfly valve as in claim 1, wherein said pressure side surface and said suction side surface each defines an area, and wherein said elongated members of said first series are regularly spaced apart on said pressure side surface so as to define a first sector which is in a range of about a quarter to about a half of the area of said pressure side surface, while said elongated members of said second series are regularly spaced apart on said suction side surface so as to define a second sector which is in a range extending from about a quarter to about a half of the area of said suction side surface.

8. A butterfly valve as in claim 1, wherein said elongated members have a length and a width, and wherein the ratio of the length to the width is in a range extending from about 1.5 to about 3.0.

9. In a butterfly valve comprising a valve housing defining a flow path, and a disc having a center and a diameter, said disc being pivotally mounted in said valve housing for rotation about an axis between an open position for allowing the passage of a gas flow through said valve housing and a closed position wherein said disc closes all the gas flow through said valve housing, said axis extending centrally of said disc and dividing said disc into first and second sections, said disc having a pressure side surface adapted to face upstream and a suction side surface adapted to face downstream, said disc including a noise attenuating means having a first series of separate elongated members fixedly attached to said pressure side surface and extending at an acute angle from said first section of said pressure side surface and a second series of separate elongated members fixedly attached to said suction side surface and extending at an acute angle from said second section of said suction side surface, said elongated members of said first and second series being mounted to said disc at a distance from said center of said disc of about a third of said diameter, whereby said elongated members are effective for attenuating aerodynamic throttling noise without obstructing significantly the flow of gas.

10. A butterfly valve as in claim 9, wherein said pressure side surface and said suction side surface each defines an area, and wherein said elongated members of said first series are regularly spaced apart on said pressure side surface so as to define a first sector which is in a range of about a quarter to about a half of the area of said pressure side surface, while said elongated members of said second series are regularly spaced apart on said suction side surface so as to define a second sector which is in a range extending from about a quarter to about a half of the area of said suction side surface.

11. A butterfly valve as in claim 9, wherein each said elongated members have a length and a width, and wherein the ratio of the length to the width is in a range extending from about 1.5 to about 3.0.

12. A butterfly valve as in claim 11, wherein said acute angle is about 45 degree.

13. A butterfly valve as in claim 9, wherein said first and second series of separate elongated members are provided with the same number of elongated members.

14. A butterfly valve as in claim 13, wherein each elongated member of said second series is diametrically opposed to an elongated member of said first series.

15. A butterfly valve as in claim 13, wherein each said first and second series of separate elongated members includes at least three elongated members.

16. In a gas turbine engine having a source of pressurized fluids and a duct means defining a flow path for conveying said pressurized fluids, a butterfly valve having a closure member pivotally mounted in said duct means for rotation about an axis between an open position for allowing the passage of said pressurized fluids through said duct means and a closed position wherein said closure member closes all the fluids flow through said duct means, said axis extending centrally of said closure member and dividing said closure member into first and second sections, said closure member having a pressure side surface adapted to face upstream and a suction side surface adapted to face downstream, said closure member including a noise attenuating means having a first series of separate elongated members fixedly attached to said pressure side surface and extending from said first section of said pressure side surface and a second series of separate elongated members fixedly attached to said suction side surface and extending from said second section of said suction side surface, whereby the elongated members are effective for attenuating aerodynamic throttling noise without obstructing significantly the flow of pressurized fluids.

* * * * *